US008775810B1

(12) United States Patent
Snodgrass et al.

(10) Patent No.: US 8,775,810 B1
(45) Date of Patent: Jul. 8, 2014

(54) SELF-VALIDATING AUTHENTICATION TOKEN

(75) Inventors: Ryan J. Snodgrass, Kirkland, WA (US); Joel C. Hegg, Seattle, WA (US); Ian T. R. MacLeod, Seattle, WA (US); Samuel S. Gigliotti, Seattle, WA (US); Scott G. Carmack, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 969 days.

(21) Appl. No.: 12/570,792

(22) Filed: Sep. 30, 2009

(51) Int. Cl.
*H04L 9/32* (2006.01)
*H04L 9/08* (2006.01)
*H04L 9/00* (2006.01)
*G06F 21/62* (2013.01)

(52) U.S. Cl.
CPC ... *H04L 9/08* (2013.01); *H04L 9/00* (2013.01); *G06F 21/62* (2013.01)
USPC .......................................................... 713/175

(58) Field of Classification Search
CPC ........................................................ G06F 21/62
USPC .................. 713/175, 185, 172; 726/9, 10, 20
See application file for complete search history.

(56) References Cited

U.S. PATENT DOCUMENTS

| 6,119,149 | A  | * | 9/2000 | Notani | 709/205 |
|---|---|---|---|---|---|
| 6,574,734 | B1 | * | 6/2003 | Colson et al. | 726/21 |
| 6,789,126 | B1 | * | 9/2004 | Saulpaugh et al. | 709/245 |
| 7,376,840 | B2 | * | 5/2008 | McCann et al. | 713/185 |
| 7,987,365 | B2 | * | 7/2011 | Birrell et al. | 713/170 |
| 2003/0033416 | A1 | * | 2/2003 | Schwartz | 709/230 |
| 2004/0162076 | A1 | * | 8/2004 | Chowdry et al. | 455/445 |
| 2009/0328142 | A1 | * | 12/2009 | Wang et al. | 726/2 |
| 2010/0011431 | A1 | * | 1/2010 | Cynkin et al. | 726/9 |
| 2010/0287606 | A1 | * | 11/2010 | Machani | 726/7 |

* cited by examiner

*Primary Examiner* — Dant Shaifer Harriman
(74) *Attorney, Agent, or Firm* — Thomas Horstemeyer, LLP

(57) ABSTRACT

Systems, methods, and computer-readable media provide a requesting device with access to a service. In one implementation, a server stores a token decryption key for validating an encrypted token. The server receives the encrypted token and a digital signature generated using a signature creation key from a client device, and decrypts the token with the token decryption key. The server extracts a signature validation key from the token, and validates the digital signature using the signature validation data. The system provides the client device with access to the service, based on whether the digital signature is validated.

26 Claims, 6 Drawing Sheets

SELF-VALIDATING AUTHENTICATION TOKEN

BACKGROUND

Online entities offer a wide variety of services to a variety of different client devices, including personal computers (PCs), portable digital assistants (PDAs), mobile telephones, pocket PCs, smartphones, set-top boxes, digital video recorders (DVRs), and gaming consoles, among other possibilities. These client devices often access various web services, such as online stores or other providers of audio/visual content, software programs, digital books, or other electronic content. In many cases, a request for a particular web service must be authenticated before the web service honors the request.

Some web services are configured to use software tokens to authenticate requests from client devices. In some cases, the software tokens are authenticated using encryption keys. However, these authentication schemes may require the web service to store a large number of encryption keys for validating the software tokens. For example, if each client device uses a different encryption key to access the web service, the web service may need substantial amounts of data storage capacity to store all of the encryption keys. Moreover, each time the web service receives a request with a token, the web service may use substantial processing resources to find the correct encryption key for the received token. Furthermore, the web service may have difficulty recovering from certain system failures, such as an inadvertent deletion or corruption of one or more encryption keys. Therefore, systems and methods are needed to overcome these limitations of traditional device authentication.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
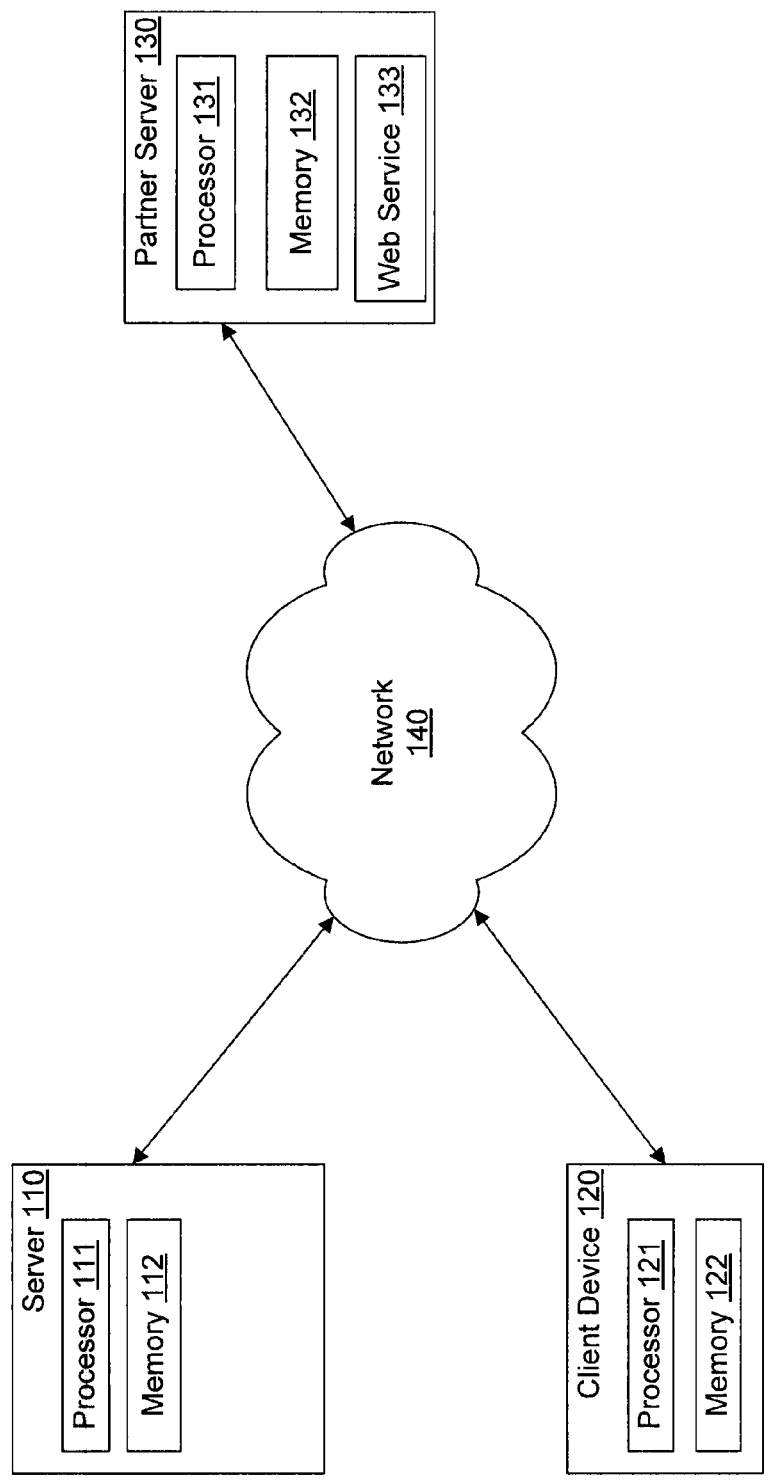
FIG. 1 is a diagram of an example of a system for providing access to a service.

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, deleting, or adding steps to the disclosed methods. Accordingly, the following detailed description is not limiting of the disclosed embodiments. Instead, the proper scope is defined by the appended claims.

Disclosed embodiments provide systems and methods for providing access to a service, such as a web service. The systems and methods may allow client devices to access a web service by transmitting an encrypted token and a digital signature to the server. The encrypted token may include signature validation data, such as a signature validation key that can be used to validate the digital signature. Upon receiving the token, the server may decrypt the token, extract the signature validation key, and validate the token using the extracted signature validation key. Because the signature validation key is included in the token, the server may not be required to store a persistent local copy of the signature validation key.

Consistent with a disclosed embodiment, a computer-implemented method provides access to a service. According to the method, an asymmetric signature key pair comprising a signature creation key and a signature validation key is generated. An asymmetric token key pair comprising a token encryption key and a token decryption key is also generated. The signature validation key is encrypted with the token encryption key to generate an encrypted token, and the encrypted token comprises at least the encrypted signature validation key. The encrypted token and the signature creation key are transmitted to a client device. The encrypted token, a request for the service, and a digital signature generated using the signature creation key are received from the client device. The token is decrypted with the token decryption key, and the signature validation key is extracted from the decrypted token. The digital signature is validated using the signature validation key, and the client device is provided with access to the service, based on at least whether the digital signature is validated.

Consistent with another disclosed embodiment, a computer-implemented method provides to a service. According to the method, a token decryption key for decrypting an encrypted token is stored. The encrypted token and a digital signature generated using a signature creation key are received from a client device, and the token is decrypted with the token decryption key. Signature validation data is extracted from the token, and the digital signature is validated using the signature validation data. The client device is provided with access to the service, based on at least whether the digital signature is validated.

Consistent with another disclosed embodiment, a system provides access to a service. The server includes a processor for executing program instructions, and a computer-readable medium storing the program instructions. The program instructions, when executed by the processor, performing a process to receive a request to access a service over a network. The program instructions may store a token decryption key for validating an encrypted token, and receive the encrypted token and a digital signature generated using a signature creation key from a client device. The program instructions may decrypt the token with the token decryption key, and extract a signature validation key from the token. The program instructions may validate the digital signature using the signature validation data, and provide the client device with access to the service, based on whether the digital signature is validated.

Consistent with other disclosed embodiments, a computer-readable storage medium may store program instructions for implementing any of the methods described herein.

FIG. 1 is an example of a system 100 for providing access to a service, consistent with one or more embodiments. System 100 may provide functionality for one or more client devices to access a service (e.g., a web service) executing on a web server. As shown in system 100, server 110, client device 120, and partner server 130 are connected to a network 140. One of skill in the art will appreciate that although a particular number of components are depicted in FIG. 1, any number of these component may be provided. One of ordinary skill in the art will also recognize that functions provided by one or more components of system 100 may be combined into one component, or distributed across a plurality of components. For example, server 110 may be implemented using a server farm including several main servers as well as several backup servers. In addition, server 110 may be implemented by distributing various processing steps discussed herein across multiple servers.

Network 140 provides communications between the various components in system 100, such as server 110, client device 120, and partner server 130. Network 110 may be a shared, public, or private network, may encompass a wide area or local area, and may be implemented through any suitable combination of wired and/or wireless communication networks. Furthermore, network 140 may comprise an intranet or the Internet.

Server 110 may comprise a general purpose computer (e.g., a personal computer, network computer, server, or mainframe computer) having one or more processors that may be selectively activated or reconfigured by a computer program. Processor 111 may perform steps or methods consistent with disclosed embodiments by reading instructions from memory 112, and executing the instructions. As discussed in more detail below, certain components of server 110 may be implemented as instructions stored in memory 112, suitable for execution by processor 111.

Memory 112 may be one or more memory or storage devices that store data as well as software. Memory 112 may also comprise, for example, one or more of RAM, ROM, magnetic storage, or optical storage. Furthermore, memory 112 may store program modules that, when executed by processor 111, perform one or more steps discussed below.

In other embodiments, server 110 may be specially constructed for carrying-out methods consistent with disclosed embodiments. For example, one or more of the processing steps disclosed herein may be implemented on a field-programmable gate array ("FPGA"), application-specific integrated circuit ("ASIC") or suitable chipset. Encryption and decryption steps discussed herein may be particularly suitable for implementation on such hardware devices.

Server 110 may provide access to various services, such as web services (not shown). Server 110 may also provide functionality for authenticating client device 120 and/or users operating client devices. For example, an entity that provides audio/visual or software content over network 140 may provide such content using server 110.

Partner server 130 may be similar in construction to server 110. For example, partner server 130 may comprise a general purpose computer (e.g., a personal computer, network computer, server, or mainframe computer) having one or more processors that may be selectively activated or reconfigured by a computer program. Furthermore, partner server 130 may communicate via network 140 with server 110 as well as client device 120. Partner server 130 may be implemented using server farms, distributed technologies, and various combinations of software and hardware in a manner analogous to the discussion above with respect to server 110. Partner server 130 may also include a memory 132, comprising instructions executable by processor 131.

Partner server 130 may provide access to various services, such as web services. Partner server 130 may also provide functionality for authenticating client device 120 and/or users operating such client devices. For example, an entity that provides audio/visual or software content over network 140 may provide such content using partner server 130. For example, partner server 130 may provide a web service 133, which is discussed in more detail below.

Client device 120 may be any type of device for communicating with server 110. For example, client device 120 may be a personal computer, handheld device (e.g., PDA, a cellular phone such as a smartphone, etc.), television, digital music player, set-top box, digital video recorder (DVR), or gaming console, or any other appropriate computing platform or device capable of exchanging data with network 140. Client device 120 may include, for example, a processor 121 and a memory 122.

Client device 120 may provide a token to server 110 or partner server 130 in order to access a web service. Suitable application logic may be implemented on client device 120 for providing the token. Client device 120 may also comprise suitable application logic for accessing a web service. For example, server 110 or partner server 130 may transmit a document (e.g., a web page) that is processed by application logic on client device 120, and displayed to a user.

In operation, server 110 may encrypt a token with a token encryption key, and include a signature validation key in the encrypted token. Server 110 may then distribute the encrypted token to client device 120. Client device 120 may subsequently request access to a web service by transmitting the encrypted token, along with a digital signature, to server 110 or partner server 130. Server 110 or partner server 130 may then decrypt the token, extract the signature validation key, and verify the digital signature. If the digital signature is verified, client device 120 may be permitted to access the web service. Otherwise, client device 120 may be prevented from accessing the web service.

Figure 2:
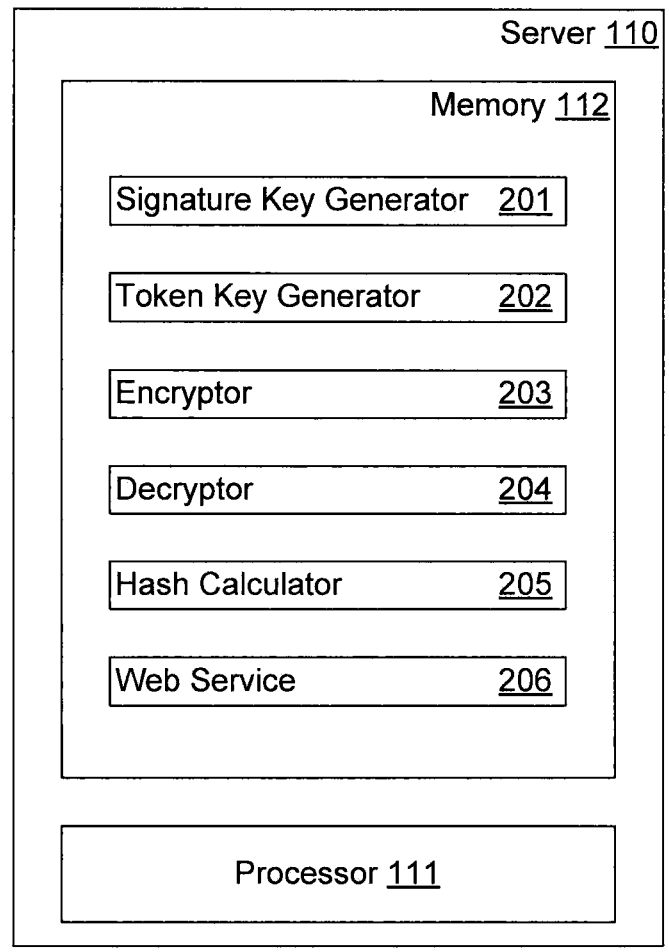
FIG. 2 is diagram of an example of an architecture of a server.

FIG. 2 shows a diagram of an example of an architecture of server 110, in accordance with one or more embodiments. As discussed above, memory 112 in server 110 may provide a service, such as web service 206. Server 110 may also include a signature key generator 201, for generating encryption keys used to create and/or validate digital signatures. In some embodiments, these keys are generated as asymmetric key pairs. The asymmetric key pair may include a signature creation key for creating the digital signature, as well as a signature validation key for validating the digital signature.

Server 110 may also include a token key generator 202 for generating encryption keys used to encrypt and decrypt digital tokens. In some embodiments, these keys comprise a single asymmetric key pair used to create tokens for a plurality of client devices (not shown) such as client device 110. The asymmetric key pair may include a token encryption key for creating the token, as well as a token decryption key for validating the token. In some embodiments, server 110 may generate a single token encryption/decryption key pair that is used to generate and decrypt tokens for a plurality of client devices. In such embodiments, server 110 may generate unique signature creation/validation keys for each client device.

Server 110 may also include an encryptor 203 for encrypting various data. For example, server 110 may generate a token for client device 120 by encrypting the unique signature validation key for client device 120 with the token encryption key. As discussed in more detail below, client device 120 may request access to web service 206 by sending the encrypted token and a digital signature to server 110. Thus, server 110 may also include a decryptor 204 for decrypting the received token to extract the signature validation key. Server 110 may also include a hash calculator 205 to calculate a hash value for validating the digital signature.

Figure 3:
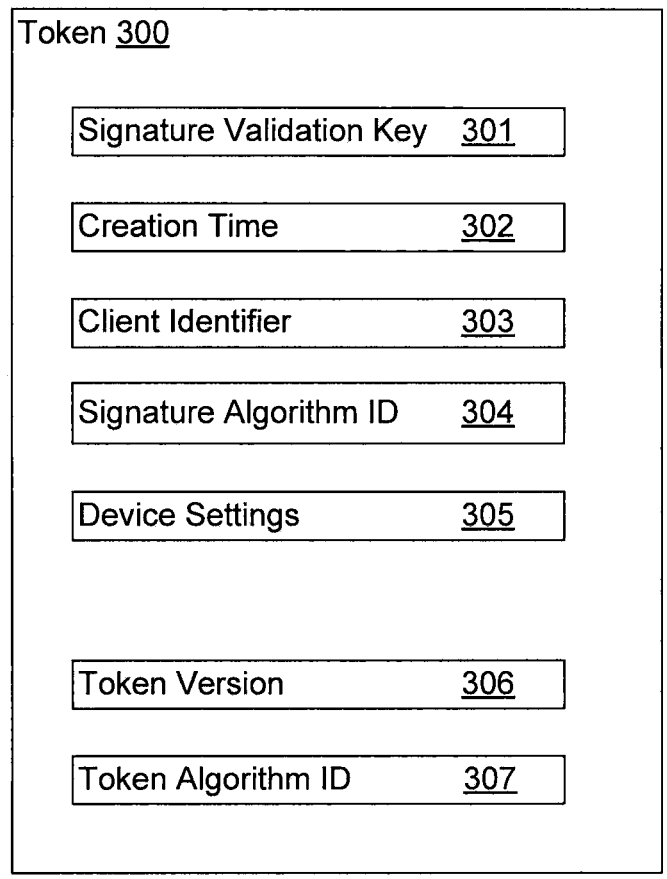
FIG. 3 is a diagram of an example of a token.

FIG. 3 illustrates an exemplary block diagram of a token 300, consistent with disclosed embodiments. Token 300 may be generated by server 110, as discussed in more detail below. As illustrated in FIG. 3, token 300 may include a signature validation key 301, creation time 302, client identifier 303, signature algorithm identifier 304, device settings 305, token version 306, and token algorithm ID 307. Signature validation key 301 may be used by server 110 to validate a digital signature. Creation time 302 may indicate the time when token 300 was created by server 110, such as a date and/or time of day. Client identifier 303 may be any value that can be used to identify client device 120, such as a MAC ID, IP address, serial number, or other identifier. Signature algorithm identifier 304 may identify an encryption algorithm that is used to verify a digital signature using signature validation key 301. Device settings 305 may be used by server 110 to determine certain features or options of web service 206 that should be provided to client device 120. For example, device settings 305 may specify a preferred file format or display format for content accessed by client device 120. Token version 306 may represent a version of token 300. For example, server 110 may periodically implement new versions of token 300, such as by adding, deleting, or modifying any one of the fields of token 300. Token algorithm ID 307 may identify an encryption algorithm used to encrypt token 300. In some embodiments, one or more of fields 301-305 of token 300 are encrypted, while token version 306 and/or token algorithm ID 307 remain unencrypted. Token 300 may also include any other additional data fields used by server 110. For example, data that server 110 must trust to be valid and unaltered may be placed into token 300.

Figure 4:
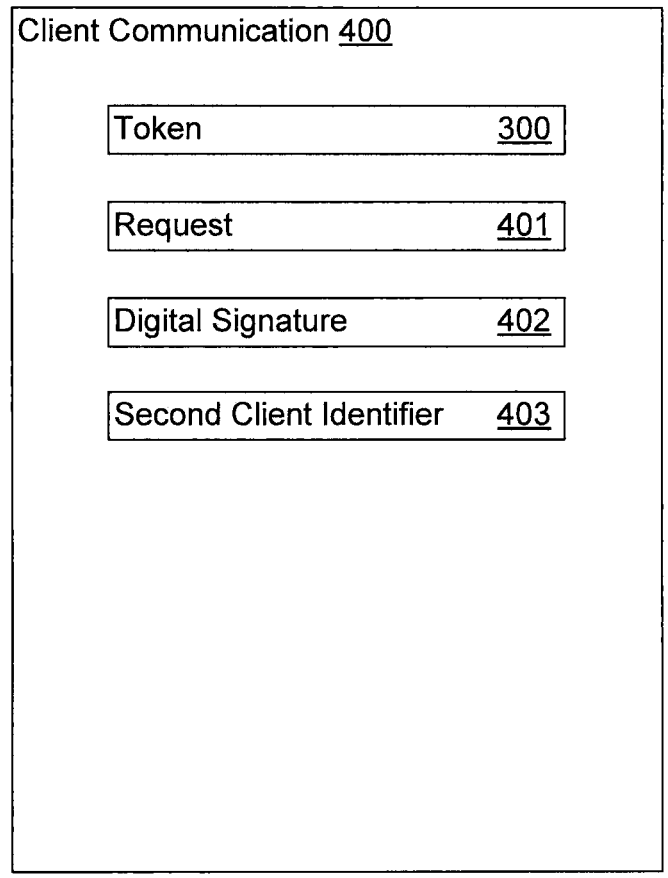
FIG. 4 is a diagram of an example of a client communication.

FIG. 4 illustrates an exemplary client communication 400. Client device 120 may transmit communication 400 to server 110 in order to request access to web service 206. As shown in FIG. 4, client communication 400 may include token 300, a request 401, a digital signature 402, and a second client identifier 403. Request 401 may include parameters specifying data being requested from web service 206. For example, request 401 may identify a particular item of electronic content available from web service 206, such as a movie, computer program, etc. Digital signature 402 may be generated by client device 120 as a function of token 300 and request 401, using the signature creation key provided to client device 120 by server 110. Second client identifier 403 may be appended, in an unencrypted form, to communication 400 by client device 120. As discussed in more detail below, server 110 may verify that second client identifier 403 matches client identifier 303 before providing access to web service 206.

Figure 5:
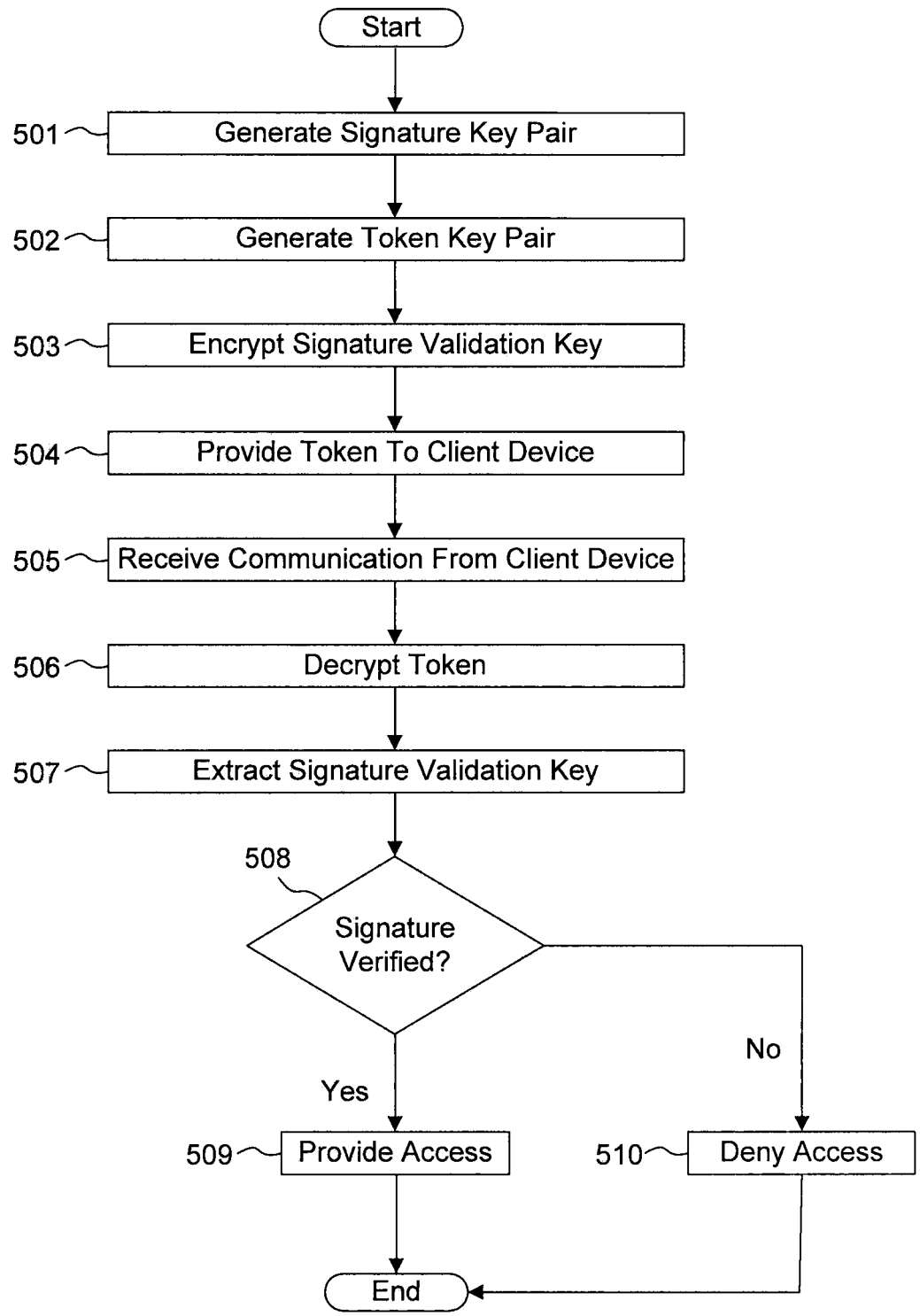
FIG. 5 is a flow diagram of an example of a routine for providing access to a service.

FIG. 5 is a flow diagram of an example of a routine 500 for providing access to a service, consistent with one or more disclosed embodiments. Routine 500 may implement processes according to one or more of program modules stored in memory 112.

At the start of routine 500, in block 501, server 110 may generate a signature key pair for client device 120. In some embodiments, the signature key pair is an asymmetric encryption key pair, including a signature creation key and a signature validation key. As discussed in more detail below, client device 120 may use the signature creation key to encrypt a hash value to create a digital signature. Thus, server 110 may also provide the signature creation key to client device 120 at this time. Server 110 may also generate additional signature key pairs for additional client devices (not shown) in block 501. In some embodiments, each client device may have a unique assigned signature key pair. Further, in some embodiments, client device 120 may generate the signature key pair instead of server 110. In such embodiments, client device 120 may provide the signature validation key to server 110.

Next, in block 502, server 110 may generate a token key pair. In some embodiments, the token key pair may constitute a single key pair that is used to create and validate tokens for a plurality of client devices. In such embodiments, unlike the signature key pairs, the token key pair is not assigned to a particular client device. However, like the signature key pairs, the token key pair may be an asymmetric encryption key pair, consisting of a token encryption key and a token decryption key. In some embodiments, server 110 may keep the token encryption key private to prevent other entities from creating tokens. Alternatively, as discussed in more detail below, server 110 may distribute the token decryption key to partner server 130, so that partner server 130 can also validate tokens.

Next, in block 503, server 110 may encrypt the signature validation key to generate token 300 for client device 120. Server 110 may use encryptor 204 to generate token 300. In some embodiments, token 300 may consist solely of the encrypted signature validation key, which is shown in FIG. 3 as signature validation key 301. However, in other embodiments, server 110 may include additional data in token 300. For example, server 110 may include creation time 302, client identifier 303, signature algorithm identifier 304, device settings 305, token version 306, and/or token algorithm ID 307 in token 300. In such embodiments, server 110 may separately encrypt any or all of items 301-307 with the token encryption key, and append the individually encrypted items 301-307. Alternatively, server 110 may append any or all of items 301-307 together, and then encrypt the appended items together using the token encryption key. In either case, token 300 may include at least signature validation key 301.

Next, in block 504, server 110 may provide token 300 to client device 120. In some embodiments, token 300 is provided to client device 120 upon initial registration of client device 120 with web service 206. For example, a user may register with web service 206 using a user name and password, a device ID, or any combination thereof. In response, server 110 may transmit token 300 to client device 120 over a secure channel, such as a Secure Sockets Layer ("SSL") or Transport Layer Security ("TLS") session. As discussed in more detail below, client device 120 may use token 300 for subsequent access to web service 206, without having to provide the user name and password.

Next, in block 505, server 110 may receive communication 400 from client device 120. Client device 120 may generate communication 400 as a means of requesting access to web service 206 without requiring the user to enter a user name and password. To generate communication 400, client device 120 may first create a request 401. Request 401 may specify the data that is requested from web service 206. Client device 120 may then append request 401 to token 300, and calculate a hash value based on the combination of request 401 and token 300. Client device 120 may then encrypt the hash value with the assigned signature creation key that client device 120 received from server 110 in block 501. The encrypted hash value is shown in FIG. 4 as digital signature 402. Client device 120 may append digital signature 402 to request 401 and token 300 to create communication 400, and transmit communication 400 to server 110.

Next, in block 506, server 110 may decrypt token 300 using decryptor 204. To do so, server 110 may first extract token 300 from communication 400. Server 110 may then decrypt token 300 using the token decryption key. Server 110 may maintain a persistent local copy of the token decryption key. In some embodiments, server 110 may store both the token decryption key and the token encryption key in a secure storage location. By maintaining access control over the token decryption key, server 110 can prevent unauthorized entities from being able to decrypt token 300.

Next, in block 507, server 110 may extract the signature validation key 301 from token 300. As discussed above, signature validation key 301 as well as the corresponding signature creation key may be assigned specifically to client device 120 by server 110. However, in some embodiments, although client device 120 was provided with an unencrypted copy of the signature creation key in block 501, client device 120 may never receive an unencrypted copy of signature validation key 301. Instead, the copy of signature validation key 301 received by client device 120 was encrypted in token 300, and client device 120 was not provided with a copy of signature validation key 301. However, because server 110 has the token decryption key required to decrypt token 300, server 110 may access signature validation key 301.

Next, in block 508, server 110 may verify digital signature 402. To do so, server 110 may decrypt digital signature 402 using signature validation key 301. As discussed above with respect to block 505, digital signature 402 is an encrypted hash value calculated based on a combination of token 300 and request 401. Server 110 may also independently calculate a hash value based on the combination of token 300 and request 401, and compare the independently calculated hash value to the decrypted digital signature.

If server 110 determines that the independently calculated hash value matches the decrypted digital signature, the digital signature is validated. This indicates that communication 400 has not been altered since created by client device 120. In this case, routine 500 moves to block 509, where server 110 provides access to web service 206.

If server 110 determines that the independently calculated hash value does not match the decrypted digital signature, the digital signature is not validated. This may indicate that an attacker has altered communication 400, or that communication 400 has otherwise been corrupted. In this case, routine 500 moves to block 510, where server 110 denies access to web service 206.

In some embodiments, blocks 505-510 of routine 500 may be implemented repeatedly to provide access to web service 206, without also performing blocks 501-504. In such embodiments, blocks 501-504 serve to provide client device 120 with token 300, and client device 120 may then repeatedly access web service 206 by providing token 300 to server 110.

Figure 6:
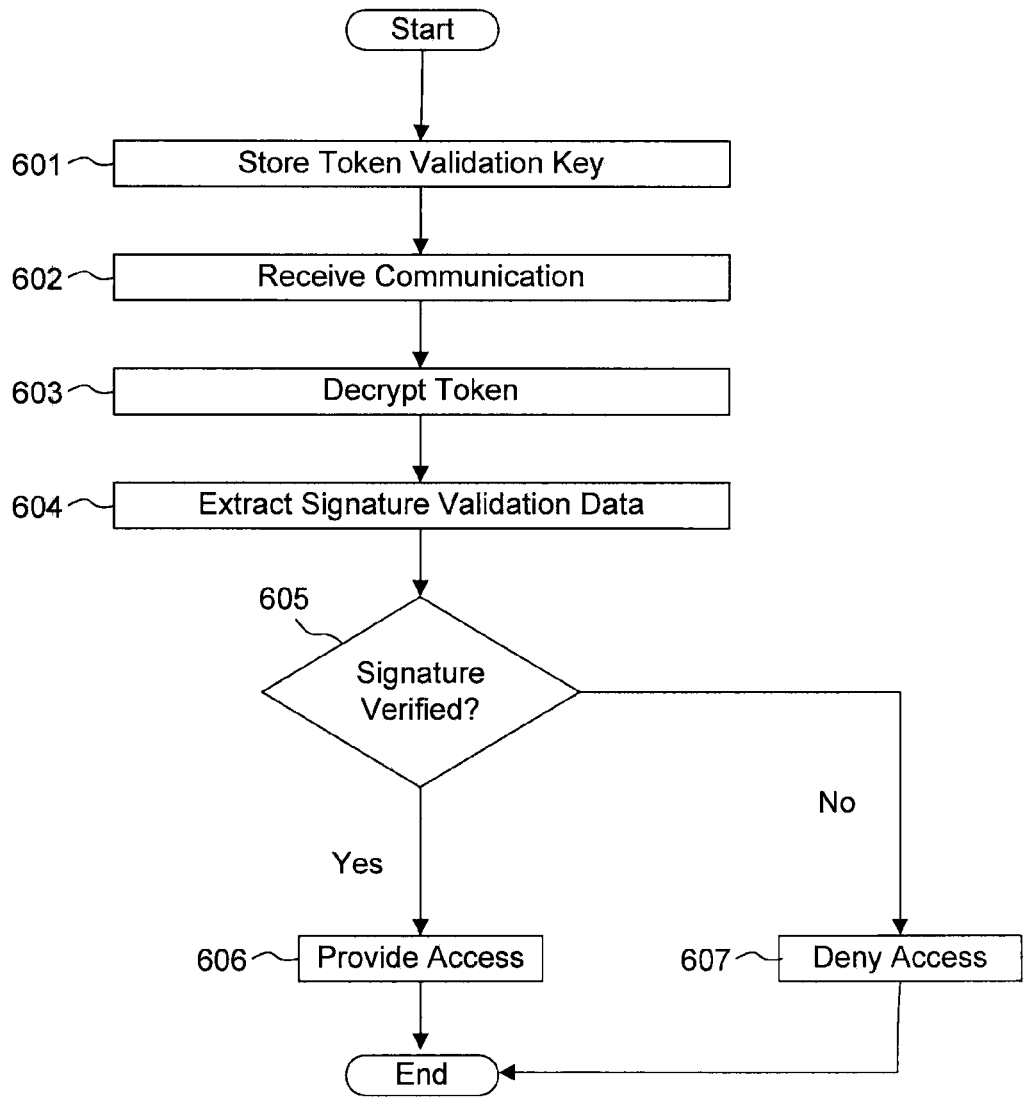
FIG. 6 is a flow diagram of another example of a routine for providing access to a service.

FIG. 6 is a flow diagram of an example of a routine 600 for providing access to a service, consistent with one or more disclosed embodiments. Routine 600 may implement processes according to one or more of program modules stored in memory 112.

As discussed above, routine 500 may be used to provide client device 120 with access to web service 206. Using routine 600, as discussed below, client device 120 may access web service 133 on partner server 130. If server 110 has already generated a signature key pair for client device 120, generated a token key pair, and provided token 300 to client device 120, partner server 130 may provide access to client device 120 without duplicating these steps.

Moreover, server 110 may prevent partner server 130 from creating token 300, by not providing a copy of the token encryption key to partner server 130. In this manner, server 110 may allow partners, such as partner server 130, to provide access to a web service using routine 600, without also having to provide partners with the ability to create token 300.

Routine 600 begins at block 601, where partner server 130 may store a token decryption key. For example, partner server 130 may have previously received the token decryption key that was generated by server 110, and discussed above in connection with block 502 of routine 500. Server 110 may distribute the token decryption key to a number of different partner servers (not shown). By doing so, server 110 may control which partner servers are able to decrypt token 300, and access signature validation key 301 encrypted therein.

Next, in block 602, partner server 130 may receive communication 300 from client device 120. As discussed above with respect to block 505, client device 120 may generate communication 400 as a means of requesting access to web service 206 without requiring the user to enter a user name and password. To generate communication 400, client device 120 may first create a request 401, indicating the data that is requested from web service 133. Client device 120 may then append request 401 to token 300, and calculate a hash value based on the combination of request 401 and token 300. Client device 120 may then encrypt the hash value with the assigned signature creation key that client device 120 received from server 110 in block 501. The encrypted hash value may constitute digital signature 402. Client device 120 may append digital signature 402 to request 401 and token 300 to create communication 400, and transmit communication 400 to partner server 130.

Next, in block 603, partner server 130 may decrypt token 300. To do so, server 110 may first extract token 300 from communication 400. Partner server 130 may then decrypt token 300 using the token decryption key provided by server 110.

Next, in block 604, partner server 130 may extract the signature validation key 301 from token 300. Note that partner server 130 has thus obtained a copy of signature validation key 301, generated by server 110 at block 501, via client device 120. In this manner, server 110 does not need to distribute signature validation keys for every client device directly to partner server 130. Rather, by encrypting signature validation key 301 in token 300, server 110 may indirectly provide signature validation key 301 to partner server 130. Further, as client device 120 does not have a copy of the token decryption key, client device 120 is unable to access signature validation key 301, despite being responsible for distributing signature validation key 301 to partner server 130.

Next, in decision block 605, partner server 130 may verify digital signature 402. To do so, partner server 130 may decrypt digital signature 402 using signature validation key 301. As discussed above, digital signature 402 is an encrypted hash value calculated based on a combination of token 300 and request 401. Partner server 110 may also independently calculate a hash value based on the combination of token 300 and request 401, and compare the independently calculated hash value to the decrypted digital signature.

If partner server 130 determines that the independently calculated hash value matches the decrypted digital signature, the digital signature is validated. This indicates that communication 400 has not been altered since created by client device 120. In this case, routine 600 moves to block 606, where server 110 provides access to web service 133.

In contrast, if partner server 130 determines that the independently calculated hash value does not match the decrypted digital signature, the digital signature is not validated. This may indicate that an attacker has altered communication 400, or that communication 400 has otherwise been corrupted. In this case, routine 600 moves to block 607, where partner server 130 denies access to web service 206.

In some embodiments, server 110 or partner server 130 may authenticate to client device 120 in routine 500 or 600, respectively. For example, after receiving communication 400 from client device 120 at block 505 or 602, respectively, server 110 or partner server 130 may generate a response to client device 120. The response may include a digital signature created using signature validation key 301. In such embodiments, client device 120 may use the corresponding signature creation key to validate the digital signature received from server 110 or partner server 130. By doing so, client device 120 can be assured that it is actually communicating with server 110 or partner server 130, and not an unauthorized party.

As one of ordinary skill in the art will appreciate, one or more of blocks 501-510 and 601-607 may be optional and may be omitted from implementations in certain embodiments. Furthermore, in some implementations, blocks 501-510 and 601-607 may be reordered, including substitute steps, and/or include additional steps.

Symmetric Key Embodiments

As discussed above, token encryption/decryption keys and signature creation/validation keys may be implemented as asymmetric key pairs. However, in some embodiments, the token encryption and token decryption keys generated in block 502 of routine 500 may be a single, symmetric encryption key. Likewise, in some embodiments, client devices are assigned a single, symmetric encryption key that may be generated in block 501 of routine 500. This symmetric key may be used as both the signature creation and signature validation keys. In some embodiments, client device 120 may generate the symmetric encryption key and provide the symmetric encryption key to server 110 for use as the signature validation key. Client device 120 may do so, for example, in block 501 of routine 500.

There are certain trade-offs in symmetric key implementations. For example, in embodiments where the token encryption and token decryption keys are a single, symmetric key, server 110 may not be able to prevent partner server 130 from creating new tokens. This is because the token decryption key shared by server 110 is also the key used to create tokens. However, symmetric encryption algorithms may require fewer processing and storage resources than asymmetric encryption algorithms. Moreover, symmetric encryption algorithms may require less network bandwidth due to the smaller data payloads for the encryption keys that are typically used for symmetric key encryption. Accordingly, in circumstances where processing, storage, or network efficiency is more important than control over which entities can create token 300, it may be desirable to use shared symmetric encryption keys to create token 300.

In embodiments where the signature creation and signature validation keys that are assigned to client device 120 are a single, symmetric key, client device 120 may also validate digital signature 402. This may not represent a significant security concern, as the symmetric key is encrypted in token 300 and therefore difficult or impossible for unauthorized parties to discover. Indeed, in symmetric signature key embodiments, client device 120 can also perform error-checking by validating digital signature 402 before sending communication 400 to server 110 or partner server 130.

Additional Fields of Token 300

In some embodiments, token 300 may consist entirely of encrypted signature validation key 301. In such embodiments, token 300 is sufficient for use in routines 500 and 600, as described above. However, token 300 may also include additional fields that can be used to extend the functionality of token 300.

For example, as discussed above, token 300 may include a creation time 302, reflecting the time when server 110 initially created token 300. In some embodiments, token 300 is valid only for a limited period of time, e.g., a week, month, etc. In such embodiments, server 110 or partner server 130 may prevent access to web services 206/133 after token 300 expires. In such embodiments, server 110 or partner server 130 may verify that token 300 is valid at blocks 508 and 605 of routines 500 and 600, respectively. In other embodiments, server 110 may start a timer when token 300 is first created or sent to client device 120, and use the timer to determine if token 300 has expired.

For example, server 110 or partner server 130 may extract the creation time from decrypted token 300 at block 508 or 605, and compare the current time (such as on a system clock) with creation time 302. If the difference exceeds a predefined time threshold, access to web service 206/133 is prevented. Otherwise, server 110 or partner server 130 provides access to web service 206/133.

In further embodiments, server 110 may refresh token 300 at periodic intervals. For example, if token 300 expires monthly, server 110 may refresh token 300 every two weeks. In some embodiments, server 110 may send client device 120 a new token any time client device 120 accesses web service 206 with a token that is at least two weeks old. In other embodiments, server 110 may "push" a new token to client device 120 periodically, regardless of whether client device 120 has accessed web service 206 within a certain amount of time. In some embodiments, server 110 may provide new tokens to partner server 130, and partner server 130 may distribute the new tokens in a similar fashion. In any case, the new token may be valid for a predefined period of time that occurs subsequent to the expiration of token 300.

As discussed above, token 300 may also include a client identifier 303. In some embodiments, client device 120 may provide client identifier 303, such as a MAC address, IP address, serial number, or user name, when initially registering with server 110. In such embodiments, server 110 may embed the received identifier directly into token 300 as client identifier 303. Thus, server 110 does not need to receive an additional identifier from client device 120 for subsequent accesses to web service 206. Rather, server 110 can simply extract client identifier 303 from token 300. In further embodiments, server 110 may generate a new, unique identifier for client device 120 at registration time, and embed this new identifier in token 300 as client identifier 303. In such embodiments, client device 120 may not have access to its own client identifier 303, because client identifier 303 is encrypted in token 300 and client device 120 may not be able to decrypt token 300.

In further embodiments, client device 120 may also provide a second client identifier 403 with communication 400. Second client identifier 403 may be provided in an unencrypted form. Server 110 or partner server 130 may compare second client identifier 403 with client identifier 303, extracted from token 300, and provide access to web services 206/133 based on whether the two identifiers match. This implementation may provide a further level of security, because even an unauthorized client device with a copy of token 300 and a copy of the signature creation key must also know the correct client identifier in order to access web services 206/133.

Token 300 may also include a signature algorithm identifier 304. Signature algorithm identifier 304 may identify the algorithm used to create digital signature 402 by client device 120. In embodiments where server 110 updates the digital signature encryption algorithm, signature algorithm identifier 304 may be used to determine which encryption algorithm is appropriate for verifying digital signature 402.

Token 300 may also include device settings 305. Device settings 305 may reflect certain preferences or settings for client device 120. Web services 206/133 may be provided in different forms, depending on these device settings. For example, if the user of client device 120 prefers to view content (e.g., movies) using a particular application on client device 120, device settings 305 may indicate that the content should be provided by web services 206/133 in a format usable by the preferred application.

Users may also wish to update device settings 305. In such embodiments, users may provide the requested device settings to server 110, and server 110 may generate a new token with these updated device settings. For example, a user may prefer a particular application for viewing content on client device 120, and the new token may indicate the preferred application.

As discussed above, token 300 may also include token version 306, which server 110 may use to track version changes to the format of token 300. For example, if server 110 updates the format of token 300 by adding, deleting, or changing a data type of any of fields 301-305 or 307, server 110 may increment token version 306. In such embodiments, server 110 may check token version 306 during routines 500 or 600 to determine which fields are included in token 300 and/or the data type of each field.

As also discussed above, token 300 may include token algorithm identifier 307, which may indicate an encryption algorithm used to create token 300. In such embodiments, server 110 may use a number of different encryption algorithms to create tokens. In embodiments where token algorithm identifier 307 is unencrypted, server 110 may extract token algorithm identifier 307 from token 300. Token algorithm identifier 307 may be used to identify decryptor 304 from a plurality of algorithm-specific decryptors on server 110. In some embodiments, two or more stages of encryption may be applied to create token 300, and additional token algorithm identifiers are provided to identify the algorithm used at each stage of encryption.

Size of Token 300

As discussed above, using a single symmetric encryption key as the assigned signature creation and validation key for client device 120 may result in a smaller token 300. This is because symmetric key algorithms may use substantially smaller (fewer bits) encryption keys than asymmetric algorithms. In some embodiments, token 300 may be compressed using a compression algorithm before being provided to client device 120 (e.g., token 300 may be compressed in a ZIP file).

In further embodiments, signature validation key 301 may be omitted from token 300. Instead, server 110 may generate a group of signature creation and validation keys (symmetric or asymmetric), and each signature creation/validation key or key pair is assigned a unique identifier. Server 110 may maintain a lookup table of the unique identifiers, assign each client device one of the unique identifiers, and embed the assigned identifier in token 300. In such embodiments, server 110 may extract the unique identifier from token 300 and retrieve the corresponding signature validation key from the lookup table in order to verify digital signature 402. In such embodiments, server 110 may also provide the lookup table to partner server 130.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, C#, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

What is claimed is:

1. A computer-implemented method for providing access to a service, comprising:

generating, via at least one of a first set of computing devices, an asymmetric signature key pair comprising a signature creation key and a signature validation key;

generating, via at least one of the first set of computing devices, an asymmetric token key pair comprising a token encryption key and a token decryption key;

encrypting, via at least one of a second set of computing devices, the signature validation key with the token encryption key to generate an encrypted token, the encrypted token comprising at least the encrypted signature validation key;

transmitting, via at least one of the second set of computing devices, the encrypted token and the signature creation key to a client device;

receiving, from the client device via at least one of the second set of computing devices, the encrypted token, a request for the service, and a digital signature for the encrypted token generated using the signature creation key;

attempting to decrypt, via at least one of the second set of computing devices, the encrypted token with the token decryption key;

extracting, via at least one of the second set of computing devices, the signature validation key from the encrypted token in response to successfully decrypting the encrypted token;

validating, via at least one of the second set of computing devices, the digital signature using the signature validation key;

notifying, via at least one of the second set of computing devices, a service provided via at least one of a third set of computing devices that the client is authorized to access the service in response to successfully validating the digital signature; and notifying, via at least one of the second set of computing devices, the service that the client is not authorized to access the service in response to unsuccessfully decrypting the encrypted token or unsuccessfully validating the digital signature.

2. The computer-implemented method according to claim 1, wherein the digital signature comprises a first hash value of the request and the encrypted token, the first hash value being calculated by the client device, and verifying, via at least one of the set of computing devices, the digital signature comprises:

calculating, via at least one of the second set of computing devices, a second hash value of the request and the encrypted token; and comparing, via at least one of the second set of computing devices, the second hash value to the first hash value.

3. The computer-implemented method according to claim 1, further comprising:

providing, via at least one of the second set of computing devices, the token decryption key to a partner server, wherein the client device accesses one or more services from the partner server using the encrypted token.

4. The computer-implemented method according to claim 1, wherein the encrypted token further comprises a creation time.

5. The computer-implemented method according to claim 1, wherein the encrypted token further comprises at least one of an identifier of the client device or a user of the client device.

6. The computer-implemented method according to claim 5, wherein the identifier comprises a first identifier and the method further comprises:

receiving, via at least one of the second set of computing devices, a second identifier from the client device in a communication that includes the request;

extracting, via at least one of the second set of computing devices, the first identifier from the token;

determining, via at least one of the second set of computing devices, whether the second identifier received from the client device matches the first identifier extracted from the token; and notifying, via at least one of the second set of computing devices, the service that the client is authorized to access the service in response to a determination that the second identifier matches the first identifier.

7. The computer-implemented method according to claim 1, wherein the encrypted token includes an unencrypted field that specifies an algorithm used to create the encrypted token.

8. The computer-implemented method according to claim 1, further comprising compressing, via at least one of the second set of computing devices, the encrypted token before transmitting the encrypted token to the client device.

9. A computer-implemented method, comprising:

storing, via at least one of a first set of computing devices, a token key generated by at least one of a second set of computing devices;

providing, via at least one of the first set of computing devices, an encrypted token generated by a service to a client device, wherein the encrypted token is encrypted with the token key and the service is provided via at least one of a third set of computing devices;

receiving from the client device, via at least one of the first set of computing devices, the encrypted token and a digital signature for the encrypted token generated using a signature creation key;

attempting to decrypt, via at least one of the first set of computing devices, the encrypted token with the token key;

extracting, via at least one of the first set of computing devices, signature validation data from the token in response to successfully decrypting the encrypted token;

validating, via at least one of the first set of computing devices, the digital signature using the signature validation data;

notifying, via at least one of the first set of computing devices, the service provided via at least one of the third set of computing devices that the client device is authorized to access the service in response to successfully validating the digital signature; and notifying, via at least one of the first set of computing devices, the service provided via at least one of the third set of computing devices that the client device is unauthorized to access the service in response to unsuccessfully decrypting the encrypted token or unsuccessfully validating the digital signature.

10. The computer-implemented method according to claim 9, wherein the signature validation data comprises an identifier of a signature validation key.

11. The computer-implemented method according to claim 10, wherein validating the digital signature further comprises:

identifying, via at least one of the first set of computing devices, the signature validation key from a plurality of signature validation keys using the identifier; and verifying, via at least one of the first set of computing devices, the digital signature using the signature validation key.

12. The computer-implemented method according to claim 9, wherein the signature validation data comprises a signature validation key used to verify the digital signature and an identifier of an algorithm used to create the digital signature.

13. The computer-implemented method according to claim 12, wherein the signature validation key comprises a symmetric encryption key that is used to create the digital signature.

14. The computer-implemented method according to claim 12, wherein the signature validation key comprises a first key from an asymmetric encryption key pair, and the asymmetric encryption key pair further comprises the signature creation key used to create the digital signature.

15. The computer-implemented method according to claim 9, wherein the token key comprises a symmetric encryption key that is used to generate the encrypted token.

16. The computer-implemented method according to claim 9, wherein the token key comprises a first key from an asymmetric encryption key pair, and the asymmetric encryption key pair further comprises a token encryption key used to create the encrypted token by encrypting the signature validation data.

17. The computer-implemented method according to claim 9, wherein providing, via at least one of the first set of computing devices, the encrypted token and the signature creation key to the client device occurs over a secure channel.

18. The computer-implemented method according to claim 9, further comprising:
registering, via at least one of the first set of computing devices, the client device with the service, wherein the client device provides at least a user name and a password registration.

19. The computer-implemented method according to claim 9, further comprising:
generating, via at least one of the first set of computing devices, a first device identifier for the client device;
including, via at least one of the first set of computing devices, the first device identifier in the encrypted token provided to the client device; and
providing, via at least one of the first set of computing devices, the client device with access to the service based on at least whether a second device identifier received from the client device in association with the digital signature matches the first device identifier.

20. The computer-implemented method according to claim 9, further comprising:
registering, via at least one of the first set of computing devices, the client device with the service, wherein the service receives a first device identification from the client device;
determining, via at least one of the first set of computing devices, whether the client device is authorized to access the service based on at least whether a second device identification included in the encrypted token matches the first device identification;
notifying, via at least one of the first set of computing devices, the service that the client device is authorized to access the service in response to determining that the second device identification matches the first device identification; and
notifying, via at least one of the first set of computing devices, the service that the client device is unauthorized to access the service in response to determining that the second device identification does not match the first device identification.

21. The computer-implemented method according to claim 9, wherein the encrypted token further includes one or more settings for the client device, wherein the one or more settings specify at least one of a preferred file format for the client device or a preferred display format for the client device, the method further comprising:
extracting, via at least one of the first set of computing devices, the one or more settings from the encrypted token; and
notifying, via at least one of the first set of computing devices, the service of the extracted one or more settings.

22. The computer-implemented method according to claim 9, the method further comprising:
storing, via at least one of the first set of computing devices, an updated encrypted token for the client device; and
providing, via at least one of the first set of computing devices, the updated encrypted token to the client device upon receiving a communication from the client device, wherein the encrypted token is valid for a first period of time, and the updated encrypted token is valid for a second, subsequent period of time.

23. The computer-implemented method according to claim 9, wherein the signature validation data comprises an asymmetric key pair generated by the client device, and the client device provides a signature validation key from the asymmetric key pair to a server that provides the access to the service.

24. A system comprising:
a processor for executing program instructions; and
a computer-readable medium storing the program instructions, the program instructions, when executed by the processor, performing a process to:
store a token decryption key for decrypting an encrypted token on a first computing device, the token decryption key being generated via a second computing device;
receive, from a client device, the encrypted token and a digital signature for the encrypted token generated using a signature creation key;
decrypt the encrypted token with the token decryption key;
extract a signature validation key from the decrypted token;
validate the digital signature using the signature validation key;
notify a service provided by a second computing device that the client is authorized to access the service in response to successfully validating the digital signature; and
notify the service that client is unauthorized to access the service in response to unsuccessfully validating the digital signature.

25. A non-transitory computer-readable medium embodying a program executable in at least one computing device, comprising;
code that receives, from a client device, an encrypted token and a first digital signature for the encrypted token generated using a signature creation key, wherein the encrypted token comprises a signature validation key and a first client identifier;
code that decrypts the encrypted token with a token decryption key;
code that extracts the signature validation key and the first client identifier from the decrypted token;
code that generates a second digital signature for the encrypted token using the signature validation key;
code that determines whether the first digital signature matches the second digital signature;
code that determines whether the first client identifier matches a second client identifier previously registered with a service accessible by the client device, wherein the service is provided by at least one other computing device;
code that notifies the service that the client device is authorized to access the service in response to determining that the first digital signature matches the second digital signature and that the first client identifier matches the second client identifier; and
code that notifies the service that the client device is unauthorized to access the service in response to determining that the first digital signature does not match the second digital signature or that the first client identifier does not match the second client identifier.

26. The non-transitory computer-readable medium of claim 25, wherein the first client identifier comprises an identifier unique to the client device.

* * * * *